(12) United States Patent
Masuda et al.

(10) Patent No.: US 8,441,525 B2
(45) Date of Patent: May 14, 2013

(54) METHOD FOR SYNCHRONIZING REMOTE DEVICE

(75) Inventors: Noriaki Masuda, Yokohama (JP); Koichi Matsuo, Yokohama (JP); Yuko Nakai, Tokyo (JP)

(73) Assignee: Freescale Semiconductor, Inc., Austin, TX (US)

( * ) Notice: Subject to any disclaimer, the term of this patent is extended or adjusted under 35 U.S.C. 154(b) by 488 days.

(21) Appl. No.: 12/778,068

(22) Filed: May 11, 2010

(65) Prior Publication Data

US 2011/0279658 A1    Nov. 17, 2011

(51) Int. Cl.
*H04N 13/04*   (2006.01)
*H04N 9/47*    (2006.01)
*H04W 4/00*    (2009.01)
*H03K 9/00*    (2006.01)
*H04L 27/00*   (2006.01)
*G09G 3/00*    (2006.01)

(52) U.S. Cl.
USPC ............... 348/53; 370/330; 375/316; 345/32

(58) Field of Classification Search .................. 348/53
See application file for complete search history.

(56) References Cited

U.S. PATENT DOCUMENTS

| | | | |
|---|---|---|---|
| 6,016,313 A * | 1/2000 | Foster et al. | 370/330 |
| 6,529,175 B2 | 3/2003 | Tsevkovnyuk | |
| 6,727,867 B2 | 4/2004 | Divelbiss | |
| 7,359,459 B2 * | 4/2008 | Shvodian et al. | 375/316 |
| 2008/0036854 A1 | 2/2008 | Elliot | |
| 2008/0043203 A1 | 2/2008 | Jacobs | |
| 2008/0143895 A1 | 6/2008 | Peterka | |
| 2009/0109282 A1 | 4/2009 | Schnebly | |
| 2010/0045784 A1 | 2/2010 | Okazaki et al. | |
| 2010/0066820 A1 | 3/2010 | Park | |
| 2010/0315316 A1 * | 12/2010 | Mihara et al. | 345/32 |

* cited by examiner

*Primary Examiner* — Christopher S Kelley
*Assistant Examiner* — Hee-Yong Kim
(74) *Attorney, Agent, or Firm* — Charles Bergere

(57) ABSTRACT

A method for synchronizing a function on a remote device with a function on a primary device includes selectively broadcasting, from a radio frequency (RF) transmitter of the primary device, data broadcast on channels at different times relative to a fixed period strobe signal of the primary device. Only the channels that have a noise level below a specified threshold level selectively broadcast the data and each of the channels have an associated fixed time frame offset relative to the fixed period strobe signal. Each of the channels is broadcast after their associated fixed time frame offset expires. An RF receiver of the remote device receives the data on one of the channels. The data on each of the channels is received at different times, depending on its associated fixed time frame offset, which results in the data on each received channel having an associated received time reference relative to a strobe signal of the remote device. The remote device strobe signal is synchronized to determine a received time reference and the fixed time frame offset. The remote device function is cyclically performed, which results in the remote device function being synchronized with the primary device function. The method may be used to synchronize a 3D video signal broadcast from a transmitter to sets of 3D glasses.

17 Claims, 4 Drawing Sheets

METHOD FOR SYNCHRONIZING REMOTE DEVICE

BACKGROUND OF THE INVENTION

The present invention relates to synchronizing a remote device with a primary device, and more particularly, to a method for synchronizing a video signal of a primary device in a remote device. The invention is particularly useful for systems that have a radio frequency link that enables data communication between the primary device and the remote device.

Electronic devices that communicate over a radio frequency (RF) link may have synchronization issues. For instance, in a system including a primary device that broadcasts data to one or more remote devices over the RF link, accurate synchronized interaction between a remote device function and a primary device function may be highly desirable. An example of the need for accurate synchronized interaction is when the primary device is a television, with a primary device function of displaying three dimensional (3D) pictures on a display screen, and the remote device is a pair of 3D glasses for viewing the 3D pictures on the screen. In this example, one remote device function is controlling the transparency of the shuttered left and right eye lenses of the glasses and the primary device function is the displaying of left and right eye images on the display screen. Minor differences in the timing of the controlling of the transparency of the shuttered left and right eye lenses and the left and right eye images displayed in frames on the display screen may cause a user to experience undesirable side effects, such as a headache or sore eyes. Accordingly, the possibility of such side effects can be reduced by accurate timing of the transparency of the shuttered left and right eye lenses so that the left and right eye lenses are adequately synchronized with the left and right eye images on the display screen.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

Figure 1:
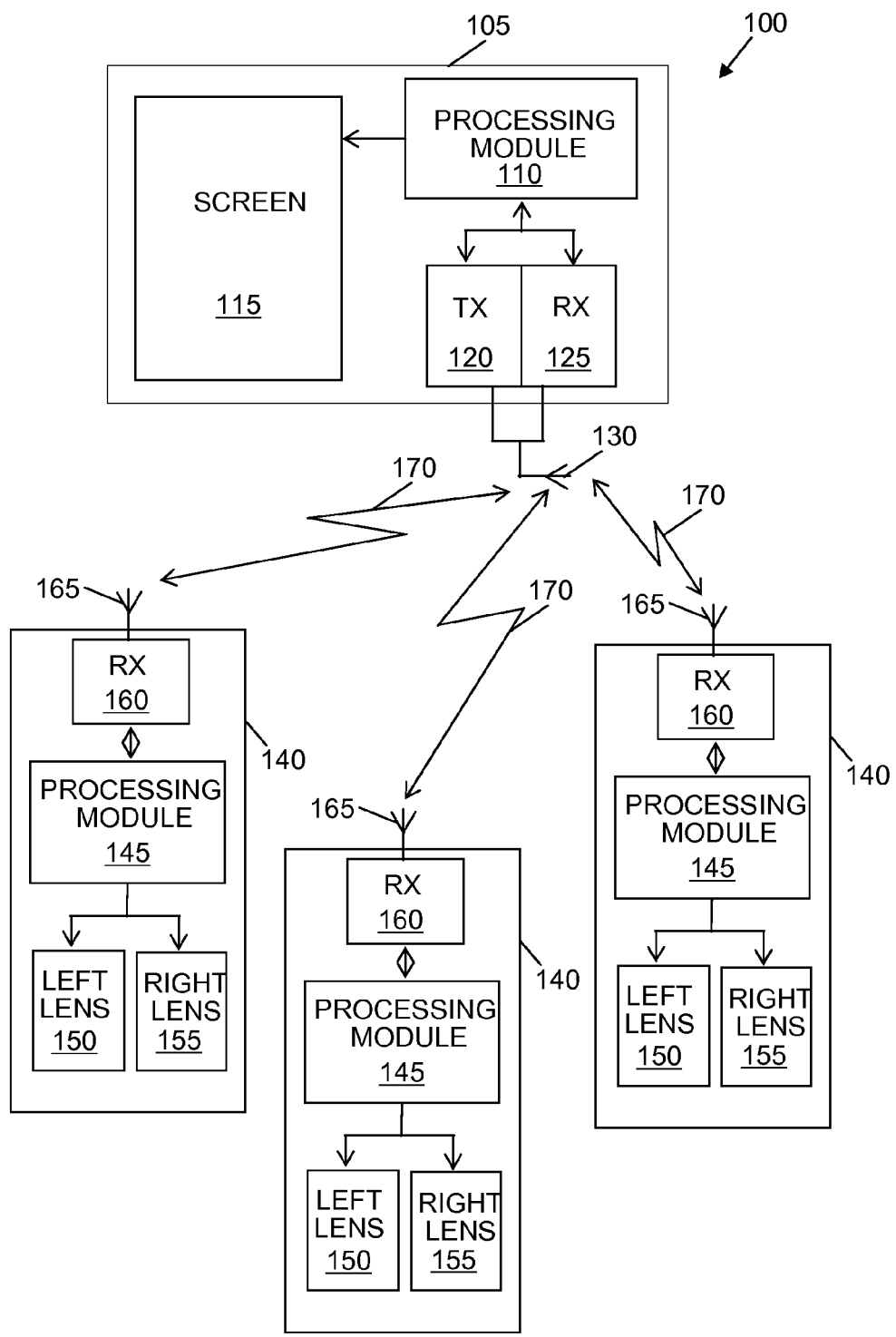
FIG. 1 is a schematic block diagram of a synchronization system in accordance with an embodiment of the present invention.

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the spirit and scope of the invention. In the drawings, like numerals are used to indicate like elements throughout. It should also be understood that throughout this specification the term television has the broad meaning of any device that displays a moving picture on a display screen. It should also be understood that throughout this specification the term data may include any information transmitted over a channel and may simply mean: timing information; information that identifies the channel; information contained in a single bit or bits; preamble channel information; or any other type of information associated with the channel. Further, the terms "comprises," "comprising," or any other variation thereof, are intended to cover a non-exclusive inclusion, such that circuit, device components and method steps that comprises a list of elements or steps does not include only those elements but may include other elements or steps not expressly listed or inherent to such circuit, device components or steps. An element or step proceeded by "comprises . . . a" does not, without more constraints, preclude the existence of additional identical elements or steps that comprises the element or step.

In one embodiment, the present invention provides a method for synchronizing a remote device function on a remote device with a primary device function on a primary device. The method includes selectively broadcasting, from a RF transmitter of the primary device, data on a plurality of channels. The data is broadcast on each of the channels at different times relative to a fixed period strobe signal of the primary device. However, only the channels that have a noise level below a specified threshold level selectively broadcast the data and each of the channels have an associated fixed time frame offset relative to the fixed period strobe signal. Also, each of the channels is broadcast after their associated fixed time frame offset expires. The method also performs receiving, at a radio frequency receiver of the remote device, the data on at least one channel of the plurality of channels. The data on each of the channels is received at different times, depending on their associated fixed time frame offset, thereby resulting in the data on the at least one channel having an associated received time reference relative to a remote device strobe signal of the remote device. Next there is performed a process of synchronizing the remote device strobe signal. The synchronizing is determined from the received time reference and the fixed time frame offset. Finally, method provides for cyclically performing the remote device function, wherein the remote device function is synchronized with the primary device function to provide a synchronized interaction therebetween, and wherein the remote device function is synchronized with the primary device function by referencing the remote device strobe signal.

In another embodiment, the present invention provides a method for synchronizing at least one remote device function on a remote device with at least one primary device function on a primary device. The method is performed by the remote device and the method includes processing data that has been selectively broadcast, on a plurality of channels, by a radio frequency transmitter of the primary device and received on at least one of the channels by a receiver of the remote device. This data has been broadcast on each of the channels at different times, relative to a fixed period strobe signal of the primary device, and only the channels that have a noise level below a specified threshold level have selectively broadcast the data. Also, each of the channels have an associated fixed time frame offset, relative to the fixed period strobe signal, and each of the channels has been broadcasted after their associated fixed time frame offset expires. The method also performs determining, from the data received on at least one channel of the plurality of channels, an associated received time reference. The associated received time reference is relative to a remote device strobe signal of the remote device and the data on each of the channels is received at different times depending on their associated fixed time frame offset. Next there is performed a process of synchronizing the remote device strobe signal. The synchronizing is determined from the received time reference and the fixed time frame offset. Finally, method provides for cyclically performing the remote device function, wherein the remote device function is synchronized with the primary device function to provide a synchronized interaction therebetween, and wherein the remote device function is synchronized with the primary device function by referencing the remote device strobe signal.

Referring to FIG. 1 there is illustrated a block diagram of a system 100 that performs the present invention in accordance with a preferred embodiment. The system 100 includes a primary device 105 in the form a television with three dimensional picture capabilities. The primary device 105 has a processing module 110 coupled to a display screen 115, the processing module 110 is also coupled to a radio frequency transmitter 120 and a primary device radio frequency receiver 125. The radio frequency transmitter 120 and the primary device radio frequency receiver 125 are coupled to a common antenna 130 and typically the radio frequency transmitter 120 and the primary device radio frequency receiver 125 are embodied in a transceiver.

The system 100 also includes at least one remote device 140 and as illustrated there are three such devices. Each remote device 140 includes a processing module 145 coupled to a both a shuttered left lens 150 and a shuttered right lens 155, the processing module 110 is also coupled a remote device radio frequency receiver 160. The remote device radio frequency receiver 160 is coupled to an antenna 165 and the antenna 165 and common antenna 130 allow for radio frequency communication between the primary device 105 and each remote device 140 across a radio frequency link 170. The shuttered left lens 150 and shuttered right lens 155 have electronic shutters that selectively control the transparency of the lenses 150, 155 for synchronized viewing with left and right eye images displayed on the display screen 115. To facilitate this synchronization the primary module 105 broadcasts data to each remote device 140 across the radio frequency link 170. Also, in one embodiment each remote device 140 may have a transmitter for sending data or signals such as acknowledge signals to the primary device 105 across the radio frequency link 170.

Figure 2:
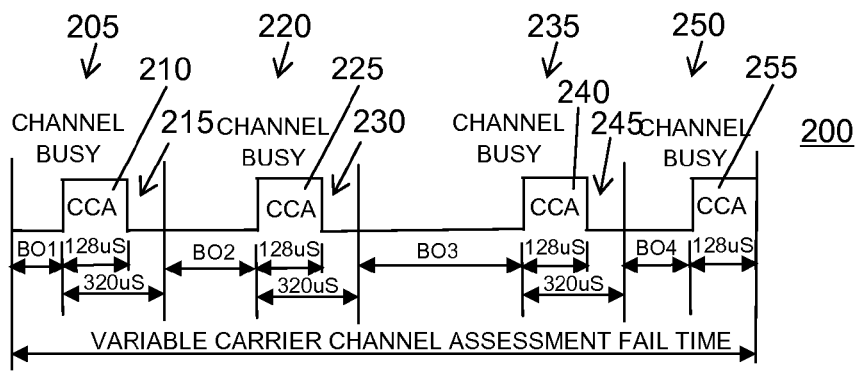
FIG. 2 is a timing diagram of a conventional carrier channel assessment process using the RF4CE protocol that is compliant with the IEEE 802.13.4 standard.

Referring to FIG. 2 there is illustrated a prior art timing diagram of a carrier channel assessment process 200 using the RF4CE protocol that is compliant with the IEEE 802.13.4 standard. The process 200 can be used by the system 100 to determine if data should be broadcast over a channel (CN) and the process 200 therefore performs a carrier channel assessment test to determine if noise is detected on the channel CN. In this regard, noise refers generally to the detection of data already being broadcast on the channel CN by some other device or devices (channel busy). The process 200 includes a first channel assessment test window 205 comprising a variable back-off time B01, a carrier channel assessment (CCA) sub-window 210 that has a fixed time duration (FTD) of 128 uS and an end of assessment wait time 215. As shown, the carrier channel assessment (CCA) sub-window 210 fixed time duration FTD, plus the end of assessment wait time 220, equals 320 uS and the first channel assessment test sub-window 210 has a duration of BO1+320 uS.

There is also a second channel assessment test window 220 comprising a variable back-off time B02, a carrier channel assessment (CCA) sub-window 225 with a fixed time duration FTD of 128 uS and an end of assessment wait time 230. Again, the carrier channel assessment sub-window (CCA) 225 fixed time duration FTD, plus the end of assessment wait time 230 equals 320 uS, and the second channel assessment test window 220 has a duration of BO2+320 uS.

There is also a third channel assessment test window 235 comprising a variable back-off time B03, a carrier channel assessment (CCA) sub-window 240 with a fixed time duration FTD of 128 uS and an end of assessment wait time 245. Again, the carrier channel assessment sub-window (CCA) 240 fixed time duration FTD, plus the end of assessment wait time 245 equals 320 uS, and the third channel assessment test window 235 has a duration of BO3+320 uS.

Finally, as shown, there is a fourth channel assessment test window 250 comprising a variable back-off time B04, a carrier channel assessment (CCA) sub-window 255 with a fixed time duration FTD of 128 uS. The fourth channel assessment test window 250 does not have an end of assessment wait time and therefore the fourth channel assessment test window 250 has a duration of BO4+128 uS.

When for instance, the process 200 is used by the system 100 and the process 200 complies with the RF4CE protocol, each of the variable back-off times B01, B02, B03 and B04 is determined by a random number $(RN)*(2^{BE}-1)*320$ uS. The random number RN is generated by the processing module 110 and BE is an assigned integer (designated as macMinBE in the RF4CE protocol) that is typically set for example to 3. The process 200 also illustrates that a maximum number of back-offs of 3 has been assigned to a macMaxCSMAbackoff in the RF4CE protocol and therefore the maximum number of channel assessment test windows is limited to 4 in this example.

From the above, it can be seen that the process 200 checks four times to determine if the channel CN is not busy during the carrier channel assessment (CCA) sub-windows, 210, 225, 240 and 255. During each of the four assessments the noise level on the channel CN was above a specified threshold level and thus the channel CN was determined to be unavailable or busy. Consequently, in this example the carrier channel assessment process 200 resulted in a fail and the process 200 has a Variable Carrier Channel Assessment Fail Time (VCCAFT) of (BO1+320 uS)+(BO2+320 uS)+(BO3+320 uS)+(BO4+120 uS). This Variable Carrier Channel Assessment Fail Time VCCAFT is variable and indeterminate due to the random numbers (RN) used to generate BO1, BO2, BO3 and BO4.

Figure 3:
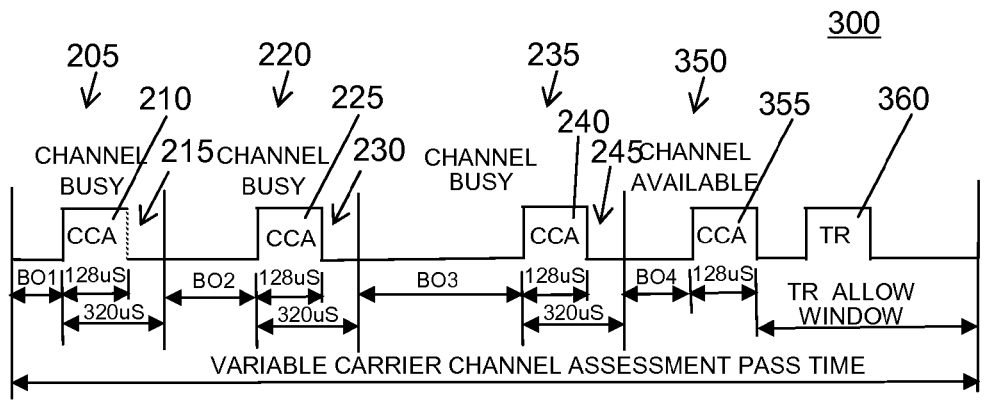
FIG. 3 is another timing diagram of a conventional carrier channel assessment process using the RF4CE protocol.

Referring to FIG. 3 there is illustrated another prior art timing diagram of a carrier channel assessment process 300 using the RF4CE protocol that is compliant with the IEEE 802.13.4 standard. The carrier channel assessment process 300 is similar to the carrier channel assessment process 200 and therefore to avoid repetition only the differences will be described. As shown, there is a fourth channel assessment test window 350 that detects that the channel is available during a carrier channel assessment (CCA) sub-window 355. Consequently, shortly after the carrier channel assessment (CCA) sub-window 355 determines that the channel CN is available then a transmit signal 360 is generated during a transmit allow window (TR ALLOW WINDOW) indicating that the radio frequency transmitter 120 should transmit data on this channel.

From the above, it can be seen that the process 300 checks four times to determine if a channel is not busy during the carrier channel assessment (CCA) sub-windows, 210, 225, 240 and 355. During each of the first three assessments the noise level on the channel was above a specified threshold level and thus the channel was determined to be unavailable or busy. However, during the fourth assessment in sub-window 355, the channel is determined as available (not busy). Consequently, in this example the carrier channel assessment process 300 resulted in a pass and the process 300 has a Variable Carrier Channel Assessment Pass Time (VCCAPT) of (BO1+320 uS)+(BO2+320 uS)+(BO3+320 uS)+(BO4+128 uS+TR ALLOW WINDOW) and this Variable Carrier Channel Assessment Pass Time VCCAPT is variable due to the way BO1, BO2, BO3 and BO4 are determined. It will be apparent that the process 300 may result in a pass by any of the channel assessment test windows 205, 220, 235 or 350. Hence, if the carrier channel assessment (CCA) sub-window 210 determines that the channel CN is available then the Variable Carrier Channel Assessment Pass Time (VCCAPT) will be (BO1+128 uS+TR ALLOW WINDOW). Alternatively, if the carrier channel assessment (CCA) sub-window 225 determines that the channel CN is available then the Variable Carrier Channel Assessment Pass Time (VCCAPT) will be (BO1+320 uS)+(BO2+128 uS+TR ALLOW WINDOW). In yet another possibility, if the carrier channel assessment (CCA) sub-window 240 determines that the channel CN is available then the Variable Carrier Channel Assessment Pass Time (VCCAPT) will be (BO1+320 uS)+(BO1+320 uS)+(BO2+128 uS+TR ALLOW WINDOW).

From the foregoing it will be apparent that both the carrier channel assessment processes 200 and 300 are variable in length. Also, the carrier channel assessment processes 200 and 300 can take an unacceptably long time when used by systems that require to cyclically broadcast data on one or more channels. This unacceptably long time is of concern when the required time to determine channel availability affects the ability of the system 100 to broadcast on a free channel within specified time constraints.

Figure 4:
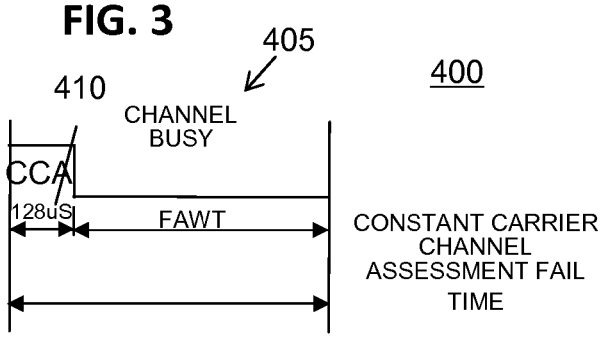
FIG. 4 is a timing diagram of a carrier channel assessment process in accordance with an embodiment of the present invention.

Referring to FIG. 4 there is illustrated a timing diagram of a carrier channel assessment process 400 in accordance with a preferred embodiment of the present invention. In this embodiment the carrier channel assessment process 400 uses the RF4CE protocol that is compliant with the IEEE 802.13.4 standard by way of example, however, the present invention is not limited to the RF4CE protocol or IEEE 802.13.4 standard. The process 400 can also be used by the system 100 to determine if data should be broadcast over the channel CN and the process 400 therefore performs a carrier channel assessment test to determine if noise is detected on the channel. The process 400 includes a single channel assessment test window 405 with a carrier channel assessment (CCA) sub-window 410 that has a fixed time duration FTD of 128 uS and a Fail Assessment Wait Time (FAWT). As shown, the carrier channel assessment test window 405 determines that the channel CN is busy. There is no back-off time and no multiple channel assessment test windows and this is accomplished in the RF4CE protocol by the macMinBE being set to 0 and the maximum number of back-offs of 0 has been assigned to a macMaxCSMAbackoff. Consequently, the process 400 has a Constant Carrier Channel Assessment Fail Time CCAFT of 128 uS+FAWT and since FAWT is constant then the Constant Carrier Channel Assessment Fail Time CCAFT is constant and determinable.

Figure 5:
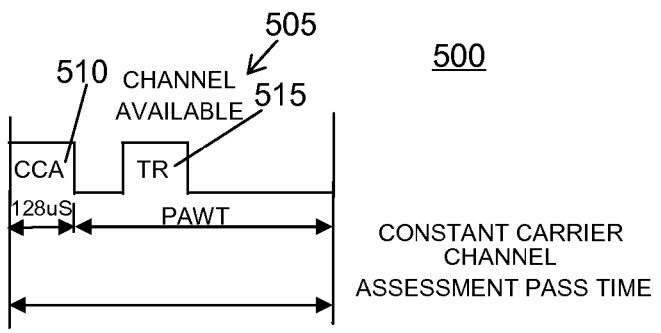
FIG. 5 is another timing diagram of a carrier channel assessment process in accordance with an embodiment of the present invention.

Referring to FIG. 5 there is illustrated another timing diagram of a carrier channel assessment process in accordance with a preferred embodiment of the present invention. Again, in this embodiment the carrier channel assessment process 500 uses the RF4CE protocol that is compliant with the IEEE 802.13.4 standard by way of example. Again, the macMinBE is set to 0 and the maximum number of back-offs of 0 has been assigned to a macMaxCSMAbackoff. The process 500 includes a single channel assessment test window 505 with a carrier channel assessment (CCA) sub-window 510 that has a fixed time duration of 128 uS and a Pass Assessment Wait Time (PAWT). As shown, the carrier channel assessment (CCA) sub-window 510 determines that the channel is available and during the Pass Assessment Wait Time PAWT a transmit signal 515 is generated during the Pass Assessment Wait Time PAWT indicating that the radio frequency transmitter 120 should transmit data on this channel. It will therefore be apparent that the process 500 has a Constant Carrier Channel Assessment PASS Time CCAPT of 128 uS+PAWT and this duration is constant and determinable. Furthermore, if required, the Constant Carrier Channel Assessment PASS Time CCAPT can be the same as the Constant Carrier Channel Assessment Fail Time CCAFT of the process 400. Furthermore, the Constant Carrier Channel Assessment PASS Time CCAPT and Constant Carrier Channel Assessment Fail Time CCAFT generally have an acceptable duration when used by systems that require to cyclically broadcast data on one or more channels within specified time constraints.

Figure 6:
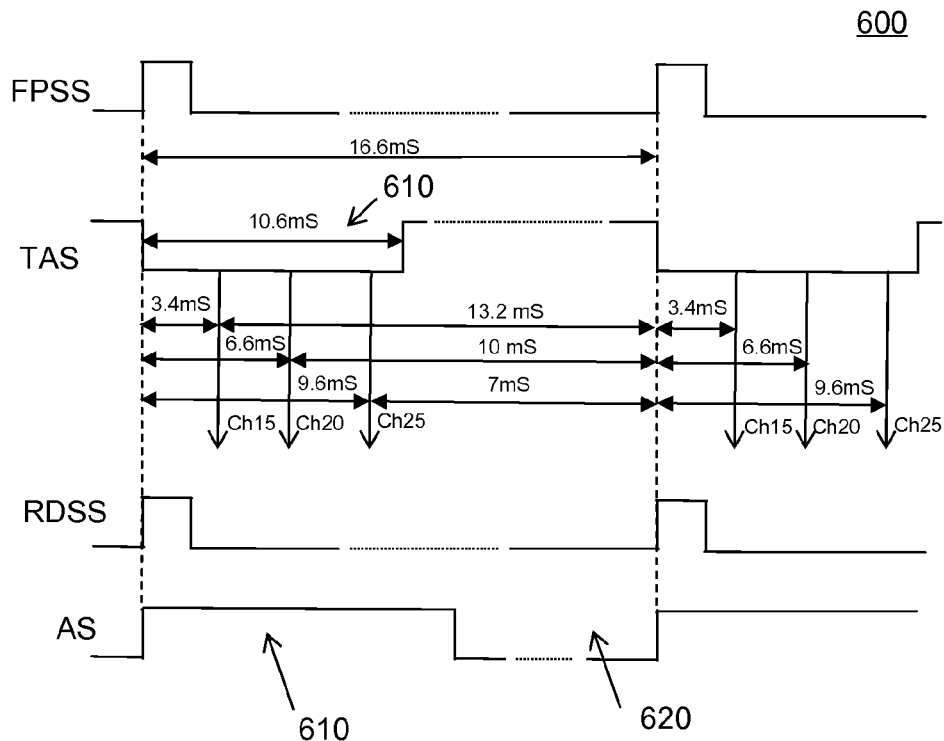
FIG. 6 is a timing diagram illustrating a timing protocol used for cyclically activating a remote device in accordance with an embodiment of the present invention.

Referring to FIG. 6 there is a timing diagram illustrating a timing protocol 600 used for cyclically activating the remote device radio frequency receiver 160 of the remote device 140 in accordance with a preferred embodiment of the present invention. The timing protocol 600 has a fixed period strobe signal (FPSS) generated by the primary device 100. In this embodiment, the fixed period strobe signal FPSS has a period (Pstrobe) of 16.6 ms. The fixed period strobe signal FPSS invokes a transmitter activation signal (TAS) that controls the radio frequency transmitter 120 so that it is activate during a broadcasting window 610 that has of 10.6 mS. During the broadcasting window 610 the primary device 100 determines if each of three channels, namely channel 15, channel 20 and channel 25 should broadcast data via the radio frequency link 170. More specifically, each of the channels 15,20,25 have an associated fixed time frame offset (FIFO) relative to the fixed period strobe signal FPSS and each of the channels 15,20,25 is broadcast after their associated fixed time frame offset FIFO expires. In this embodiment, channel 15 has an associated fixed time frame offset FIFO of 3.4 ms from the rising edge of the fixed period strobe signal FPSS, channel 20 has an associated fixed time frame offset FIFO of 6.6 ms from the rising edge of the fixed period strobe signal FPSS and channel 25 has an associated fixed time frame offset FIFO of 9.6 ms from the rising edge of the fixed period strobe signal FPSS.

The primary device radio frequency receiver 125 detects the noise level of each of the channels 15, 20, 25 during their associated fixed time frame offset (FIFO). Furthermore, the primary device radio frequency receiver 125 detects the noise level of a first one of the channels (channel 15) during a fixed first channel noise detection period (P1) the start of which is fixed relative to the rising edge of the fixed period strobe signal FPSS. The primary device radio frequency receiver 125 further detects the noise level of a second one of the channels (channel 20) during a fixed second channel noise detection period (P2) the start time of which commences after the end of the fixed first channel noise detection period P1. Similarly, the primary device radio frequency receiver 125 also detects the noise level of a second one of the channels (channel 25) during a fixed third channel noise detection period (P3) the start time of which commences after the end of the fixed second channel noise detection period P2. In this regard, the channel noise detection periods P1, P2 and P3 are constant and relatively short since the primary device radio frequency receiver 125 detects the noise level of each of the channels 15, 20, 25 by using the processes 400, 500. Consequently, the noise detection period P1 is much shorter than the fixed time frame offset FTFO of 3.4 ms, the noise detection period P2 is much shorter than the fixed time frame offset FTFO of 6.6 ms and the noise detection period P3 is much shorter than the fixed time frame offset FTFO of 9.6 ms.

The timing protocol 600 also includes a remote device strobe signal (RDSS) generated by each remote device 140, however only one a remote device strobe signal (RDSS) for one remote device is illustrated. The remote device strobe signal RDSS is synchronized with the fixed period strobe signal FPSS and under ideal circumstances (where no clock drift occurs) the remote device strobe signal RDSS has a period, in this example 16.6 mS, which is the same as the period of the fixed period strobe signal FPSS. The remote device strobe signal RDSS controls an activation signal (AS) and the remote device radio frequency receiver 160 is cyclically activated by the activation signal AS. The activation signal AS has an active period 610 during which time the data is received by the remote device radio frequency receiver 160 on at least one of the channels 15, 20, 25. The activation signal AS also has an inactive period 620 when no data can be received by the remote device radio frequency receiver 160. This inactive period 620 is at least four times longer than the duration of the active period 610 and essentially powers down the remote device radio frequency receiver 160 thereby reducing the power drain of the remote device 140.

Figure 7:
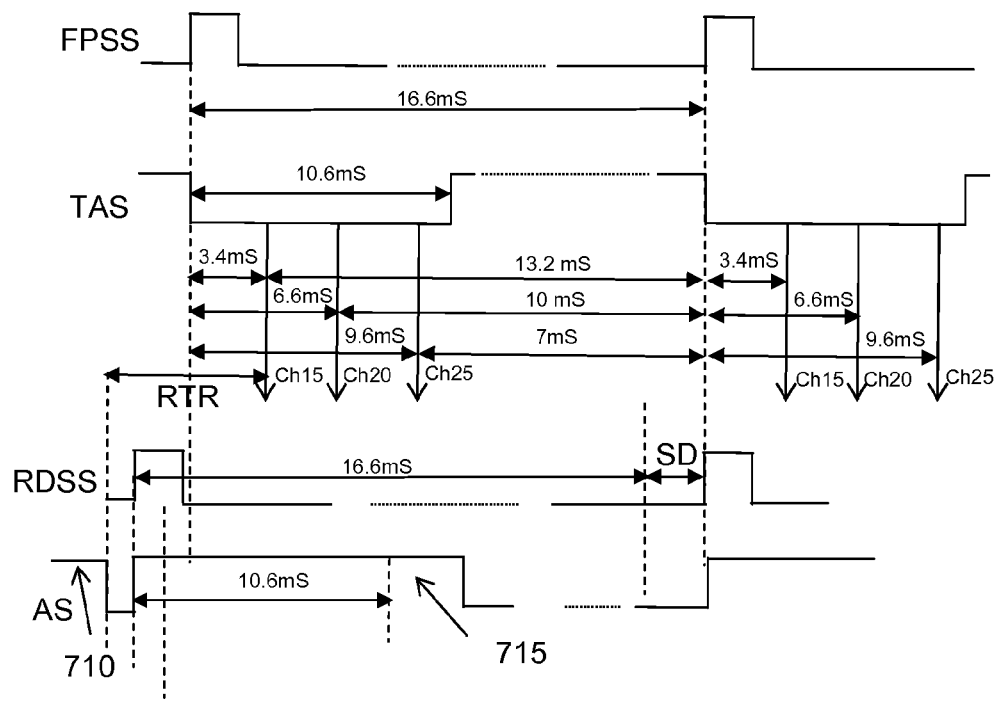
FIG. 7 is a timing diagram illustrating a synchronizing protocol used for synchronizing a remote device strobe signal with the fixed period strobe signal in accordance with an embodiment of the present invention.

Referring to FIG. 7 there is a timing diagram illustrating a synchronizing protocol 700 used for synchronizing the remote device strobe signal RDSS with the fixed period strobe signal FPSS in accordance with a preferred embodiment of the present invention. Most of the protocol and signals have been described in the timing protocol 600 however as shown the remote device strobe signal RDSS is not in synchronization with the fixed period strobe signal FPSS. This non-synchronization can occur, for instance, on power up or when resetting of either the remote device 140 or primary device 105. As shown, an active period 710 does not receive data from any of the channels 15, 20, 25 due to the remote device strobe signal RDSS being out of synchronization with the fixed period strobe signal FPSS. As a result, typically after a after a number of pre-defined cycles of the remote device strobe signal RDSS, the remote device strobe signal RDSS resets. The resetting of the remote device strobe signal RDSS causes the activation signal AS to be temporarily modified so that an active period 715 is a until: a) the data at on least one of the channels 15, 20, 25 is received; or the expiration of a pre-defined maximum activation signal period has expired.

Once the data at on least one of the channels 15, 20, 25 is received, a received time reference (RTR) relative to the remote device strobe signal RDSS is obtained for the received channel. The processing module 145 then determines the difference in timing between the remote device strobe signal RDSS and the fixed period strobe signal FPSS. This difference in timing or strobe delta (SD) is calculated by a strobe delta calculation (SDC) in which: strobe delta SD=the fixed time frame offset FTFO of a received channel−(the received time reference RTR−IPD); where IPD is an inherent processing delay of the remote device 140 that causes a difference in the actual time of the channel transmission and the time taken for the remote device to process the received channel. Once the strobe delta SD is determined, by the strobe delta calculation SDC, the remote device strobe signal RDSS is reset to synchronize with the fixed period strobe signal. The remote device strobe signal RDSS is reset by modifying its period for one cycle by a temporary modified cycle value that is calculated by: temporary modified cycle value=Period Pstrobe−strobe delta SD. It should be noted that any time there is even a small drift between the synchronization of the remote device strobe signal RDSS and the fixed period strobe signal FPSS the strobe delta calculation is immediately identified and the drift can be corrected by the above process.

Figure 8:
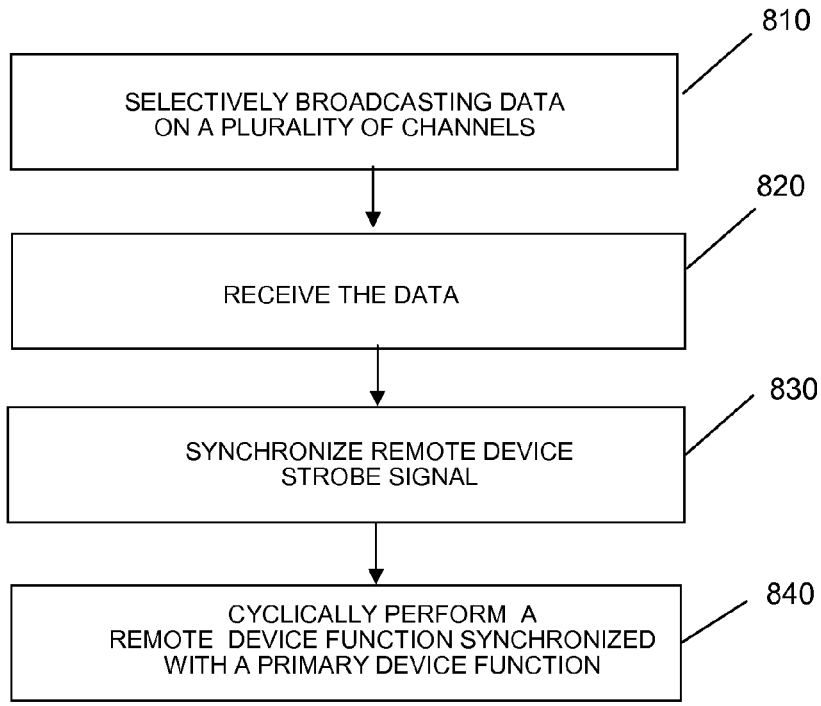
FIG. 8 is a flow chart of a method for synchronizing a remote device function with a primary device function in accordance with an embodiment of the present invention.

Referring to FIG. 8 there is illustrated a flow diagram of a method 800 for synchronizing a remote device function, on the remote device 140, with a primary device function, on the primary device 105, in accordance with a preferred embodiment of the present invention. The method 800, at a block 810, performs selectively broadcasting from the radio frequency transmitter 120 of the primary device 105, data on a plurality of channels (channel 15, channel and channel 25). The data is broadcast on each of the channels 15, 20, 25 at different times relative to the fixed period strobe signal FPSS of the primary device 105. The selective broadcasting ensures that only the channels that have a noise level below a specified threshold level selectively broadcast the data. Also, as mentioned above, each of the channels 15, 20, 25 have an associated fixed time frame offset FTFO relative to the fixed period strobe signal FPSS and each of the channels 15, 20, 25 is broadcast after their associated fixed time frame offset FTFO expires. The fixed time frame offset FTFO and the period of the fixed period strobe signal FPSS are typically broadcast to the remote device in the data. However, the period of the fixed period strobe signal FPSS may be implied by identification of the channel transmitting the data in a channel identifier in a preamble field that is part of the data. Also, the fixed time frame offset FTFO of a channel may be stored in memory of the processing module of the remote device 140.

The selectively broadcasting is characterized by the primary device receiver 125 detecting the noise level of each of the channels 15, 20, 25 by the processes 400, 500. In this regard, the primary device receiver 125 detects the noise level of the first one of the channels (channel 15) during the fixed first channel noise detection period P1 the start of which is fixed relative to the fixed period strobe signal FPSS. The primary device receiver 125 also detects the noise level of the second one of the channels (channel 20) during the fixed second channel noise detection period P2 the start time of which commences after the fixed first channel noise detection period P1 ends. Further, the primary device 105 compares the noise level of the first channel (channel 15) with the specified threshold level of the first channel during the associated fixed time frame offset for the first channel (channel 15).

At block 820 the method 800 performs receiving, at the radio frequency receiver 160 of the remote device 140, the data on at least one channel 15, 20, 25. In this regard, the data on each of the channels is received at different times depending on their associated fixed time frame offset FTFO. This results in the data on the at least one channel having the associated received time reference RTR relative to the remote device strobe signal RDSS of the remote device 140. It should be noted that the radio frequency receiver 160 receives the data on the first channel (channel 15) at a first received time reference RTR and data on the second channel (channel 20) is received at a later second received time reference RTR as described in the timing protocol 600. It should also be noted that the receiver 160 scans for a channel with an acceptable noise level that is below an acceptable threshold level. This acceptable threshold level is ideally the specified threshold level used by the primary device, and the receiver 160 locks onto a channel (either channel 15, 20 or 25) that it identifies as having an acceptable threshold level.

Next, at block 830, synchronizing the remote device strobe signal RDSS is performed. The synchronizing is determined based on the received time reference RTR and the fixed time frame offset FTFO for a specific received channel. More specifically, the synchronizing is determined as described in the synchronizing protocol 700 by use of the Period Pstrobe and strobe delta SD.

At block 840 the method 800 provides for cyclically performing at least one remote device function (RDF) on the remote device 140. The cyclically performing of the at least one remote device function RDF is synchronized with at least one primary device function (PDF) on the primary device 105 to provide a synchronized interaction between the devices 105 and 140. In addition, the remote device function RDF is synchronized with the primary device function PDF by referencing the remote device strobe signal RDSS. The remote device function in one embodiment is a cyclical activation of the remote device radio frequency receiver 160 to cyclically activate and receive the data being broadcast on each of the channels 15, 20, 25 as described in the timing protocol 600. The remote device radio frequency receiver 160 is cyclically activated by the activation signal AS that has an active period 610 during which time the data is received by the remote device radio frequency receiver 160 on at least one of the channels 15, 20, 25. The activation signal AS also has an inactive period 620 when no data can be received by the remote device radio frequency receiver 160. As previously mentioned in the timing protocol 600, the inactive period 620 is at least four times longer than the duration of the active period 610. Hence, since the inactive period 620 essentially powers down the remote device radio frequency receiver 160 the power drain of the remote device 140 is reduced.

In one embodiment, the primary device 105 is a television with three dimensional picture capabilities displayed on the display screen 115 and the remote device 140 is a pair of glasses with shuttered left and right eye lenses 150, 155. The shuttered left and right eye lenses 150, 155 have electronic shutters that selectively control the transparency of each of the lenses 150, 155 for synchronized viewing with left and right eye images displayed on the display screen 115. The remote device function can therefore be a controlling of the transparency of the shuttered left and right eye lenses 150, 155 and the primary device function is a displaying of the left and right eye images on the display screen 115. In this regard, a left lens electronic shutter is open and a right lens shutter is closed when the left eye image is displayed on the display screen 115. In contrast, the left lens electronic shutter is closed and the right lens shutter is open when a right eye image is displayed on the display screen 115.

In addition to the above, when the primary device 105 is a television with three dimensional picture capabilities the data broadcast on a channel includes information from the group: image frame frequency for images displayed on the display screen; fixed time frame offset for a channel broadcasting the data; period of the fixed period strobe signal; and shutter opening and closing ratios for the lenses.

Figure 9:
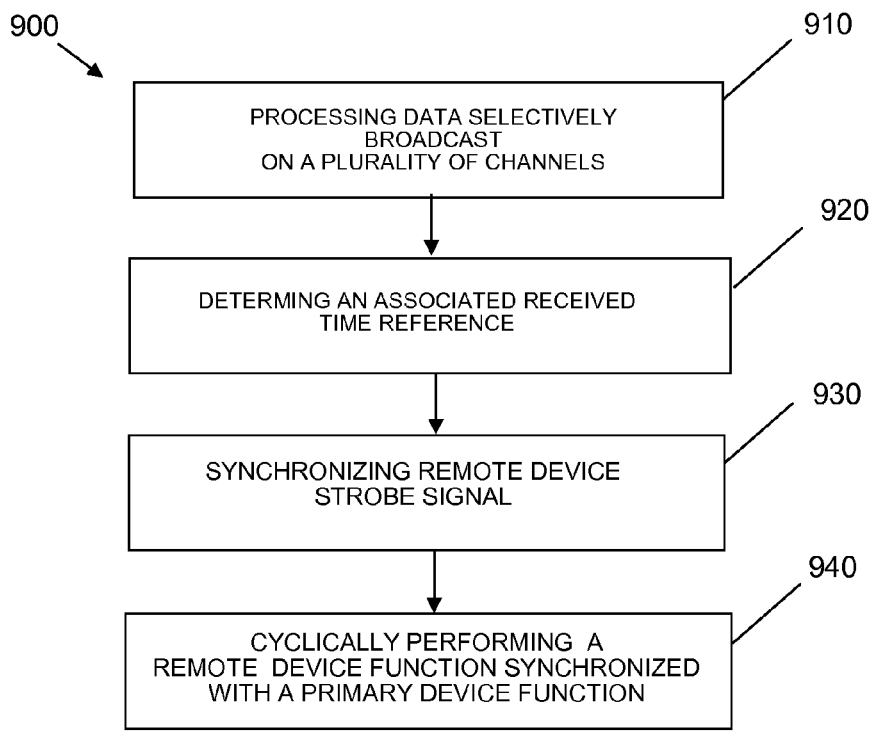
FIG. 9 is a flow chart of a method for synchronizing a remote device function on a remote device with a primary device function on a primary device in accordance with an embodiment of the present invention.

Referring to FIG. 9 a method 900 for synchronizing a remote device function on the remote device 140 with a primary device function on the primary device 105 is illustrated. The method 900 is performed by the remote device 140 in accordance with a preferred embodiment of the present invention. The method 900, at block 910, performs processing data that has been selectively broadcast on a plurality of channels (channel 15, channel 20 and channel 25) by the radio frequency transmitter 120 and received on at least one of the channels (channel 15, channel 20 and channel 25) by the receiver 160 of the remote device 140. The data has been broadcast on each of the channels 15, 20, 25 at different times relative to the fixed period strobe signal FPSS and only the channels FPSS that have a noise level below a specified threshold level have selectively broadcast the data. Also each of the channels FPSS have an associated fixed time frame offset FTFO relative to the fixed period strobe signal FPSS and each of the channels has been broadcasted after their associated fixed time frame offset FTFO expires. All other details of the processing data of block 910 are essentially the same as the selectively broadcasting of block 810 and the reader is referred to block 810 if further details are required.

At block 920 the method 900 performs determining, from the data received on at least one channel of the plurality of channels 15, 20, 25, an associated received time reference RTR relative to the remote device strobe signal RDSS. Further, the data on each of the channels 15, 20, 25 is received at different times depending on their associated fixed time frame offset FTFO. All other details of the determining of block 920 are essentially the same as the receiving of block 820 and the reader is referred to block 820 if further details are required.

Next, the method 900 provides for synchronizing at block 930 and then cyclically performing at least one remote device function on the remote device at block 940. All other details of the synchronizing of block 930 are identical to the synchronizing of block 830 and other details of the cyclically performing at least one remote device function of block 940 are identical to the cyclically performing of block 840. The reader is referred to blocks 830 and 840 if further details are required.

In one embodiment the remote device 140 has a database stored in a memory of the processing module 145. The database has a list of possible offset values and their corresponding possible strobe signal periods. This allows the remote device to function with different primary devices 105 that have different strobe periods and broadcast timing. The remote device may therefore perform a prior process (prior to either block 810 or 910) of determining which of the possible fixed time frame offsets FTFO and corresponding strobe signal periods identify the fixed time frame offset and period of the fixed period strobe signal FPSS.

Advantageously, the present invention provides or at least facilitates the accurate synchronizing of the remote device function is with the primary device function. As a result, overall performance of the system 100 may possibly be improved and the possibility of headache, sore eyes or blurring of the images is alleviated when displaying three dimensional pictures and controlling the transparency of the shuttered left and right eye lenses.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A method for synchronizing a remote device function on a remote device with a primary device function on a primary device, the method comprising:

selectively broadcasting, from a radio frequency transmitter of the primary device, data on a plurality of channels, the data being broadcast on each of the channels at different times relative to a fixed period strobe signal of the primary device, wherein only the channels that have a noise level below a specified threshold level selectively broadcast the data, and wherein each of the channels has an associated fixed time frame offset relative to the fixed period strobe signal and each of the channels broadcasts after the associated fixed time frame offset expires;

receiving, at a radio frequency receiver of the remote device, the data on at least one channel of the plurality of channels, wherein the data on each of the channels is received at different times depending on the associated fixed time frame offset thereby resulting in the data on the at least one channel having an associated received time reference relative to a remote device strobe signal of the remote device;

synchronizing the remote device strobe signal based on the received time reference and the fixed time frame offset; and cyclically performing the remote device function, wherein the cyclically performing of the remote device function is synchronized with the primary device function to provide a synchronized interaction therebetween, and wherein the remote device function is synchronized with the primary device function by referencing the remote device strobe signal, wherein the primary device is a display device with three dimensional picture capabilities displayed on a screen thereof and the remote device is a pair of glasses with left and right eye lenses with electronic shutters that selectively control the transparency of each of the lenses for synchronized viewing with left and right eye images displayed on the screen, and the data includes information from the group: image frame frequency for images displayed on the display screen; fixed time frame offset for a channel broadcasting the data; period of the fixed period strobe signal; and shutter opening and closing ratios for the lenses.

2. The method for synchronizing of claim 1, wherein the primary device has a primary device receiver and the selectively broadcasting is characterized by the primary device receiver detecting the noise level of each of the channels.

3. The method for synchronizing of claim 2, wherein the primary device receiver detects the noise level of each of the channels during their associated fixed time frame offset.

4. The method for synchronizing of claim 3, wherein the primary device receiver detects the noise level of a first one of the channels during a fixed first channel noise detection period the start of which is fixed relative to the fixed period strobe signal and wherein the primary device receiver detects the noise level of a second one of the channels during a fixed second channel noise detection period the start time of which commences after the fixed first channel noise detection period ends.

5. The method for synchronizing of claim 4, wherein the primary device compares the noise level of the first channel with the specified threshold level during the associated fixed time frame offset thereof.

6. The method for synchronizing of claim 5, wherein the remote device radio frequency receiver receives the data on the first channel at a first received time reference and data on the second channel is received at a later second received time reference.

7. The method for synchronizing of claim 1, wherein the remote device function is a cyclical activation of the radio frequency receiver to cyclically activate and receive the data being broadcast on each of the channels, wherein the radio frequency receiver is cyclically activated by an activation signal comprising an active period during which time the data is received on at least one of the channels and an inactive period when no data can be received by the radio frequency receiver.

8. The method for synchronizing of claim 7, wherein the inactive period is at least four times longer than a duration of the active period and wherein after a number of pre-defined cycles of the activation signal the radio frequency receiver does not receive the data during the active period then the activation signal is temporarily modified so that the active period is extended.

9. The method for synchronizing of claim 8, wherein the active period is extended until the data is received or until the expiration of a pre-defined maximum activation signal period has expired.

10. The method for synchronizing of claim 1, wherein the display device is a television.

11. The method for synchronizing of claim 1, wherein the remote device function comprises controlling the transparency of the left and right eye lenses and the primary device function comprises displaying the left and right eye images on the screen, and wherein a left lens electronic shutter is open and the right lens shutter is closed when the left eye image is displayed on the screen, and a left lens electronic shutter is closed and the right lens shutter is open when a right eye image is displayed on the screen.

12. The method for synchronizing of claim 1, wherein the remote device has a database of possible offset values and their corresponding possible strobe signal periods and the remote device performs a prior process of determining which of the possible fixed time frame offsets and corresponding strobe signal periods identify the fixed time frame offset and period of the fixed period strobe signal.

13. The method for synchronizing of claim 1, wherein the fixed time frame offset and period of the fixed period strobe signal are broadcast to the remote device in the data.

14. A method for synchronizing at least one remote device function on a remote device with at least one primary device function on a primary device, the method being performed by the remote device, the method comprising:

processing data that has been selectively broadcast on a plurality of channels by a radio frequency (RF) transmitter of the primary device and received on at least one of the channels by a receiver of the remote device, wherein the data has been broadcast on each of the channels at different times relative to a fixed period strobe signal of the primary device and wherein only the channels that have a noise level below a specified threshold level have selectively broadcast the data, and each of the channels has an associated fixed time frame offset relative to the fixed period strobe signal and wherein each of the channels has been broadcasted after their associated fixed time frame offset expires;

determining, from the data received on at least one channel of the plurality of channels, an associated received time reference relative to a remote device strobe signal of the remote device, wherein the data on each of the channels is received at different times depending on their associated fixed time frame offset;

synchronizing the remote device strobe signal, the synchronizing being determined from the received time reference and the fixed time frame offset; and cyclically performing the remote device function, wherein the cyclically performing of the remote device function is synchronized with the primary device function to provide a synchronized interaction therebetween, and wherein the remote device function is synchronized with the primary device function by referencing the remote device strobe signal, wherein the primary device is a television with three dimensional picture capabilities displayed on a screen thereof and the remote device is a pair of glasses with left and right eye lenses with electronic shutters that selectively control the transparency of each of the lenses for synchronized viewing with left and right eye images displayed on the screen, and the data includes information from the group: image frame frequency for images displayed on the display screen; fixed time frame offset for a channel broadcasting the data; period of the fixed period strobe signal; and shutter opening and closing ratios for the lenses.

15. The method for synchronizing as claimed in claim 14, wherein the remote device function is a cyclical activation of the radio frequency receiver to cyclically activate and receive the data being broadcast on each of the channels, wherein the radio frequency receiver is cyclically activated by an activation signal comprising an active period during which time the data is received on at least one of the channels and an inactive period when no data can be received by the radio frequency receiver.

16. The method for synchronizing of claim 14, wherein the remote device function comprises controlling the transparency of the left and right eye lenses and the primary device function comprises displaying of the left and right eye images on the screen, and wherein a left lens electronic shutter is open and the right lens shutter is closed when the left eye image is displayed on the screen, and a left lens electronic shutter is closed and the right lens shutter is open when a right eye image is displayed on the screen.

17. The method for synchronizing of claim 14, wherein the remote device has a database of possible offset values and their corresponding possible strobe signal periods and the remote device performs a prior process of determining which of the possible fixed time frame offsets and corresponding strobe signal periods identify the fixed time frame offset and period of the fixed period strobe signal.

\* \* \* \* \*